United States Patent [19]

Durante et al.

[11] 3,792,235

[45] Feb. 12, 1974

[54] SIGNAL PROCESSING SYSTEM FOR READING INDICIA OVER A WIDE DEPTH OF FIELD

[75] Inventors: Anthony C. Durante, Burlington; Frank G. Macey, Shrewsbury, both of Mass.

[73] Assignee: Servo Corporation of America, Hicksville, N.Y.

[22] Filed: Dec. 22, 1971

[21] Appl. No.: 210,869

[52] U.S. Cl.235/61.11 E, 235/61.7 R, 340/146.3 K, 250/219 D

[51] Int. Cl. .......................... G06k 7/00, G06k 7/10

[58] Field of Search .................. 340/146.3 K, 172.5; 235/61.11 E, 61.7 R; 250/219 D, 220 R

[56] References Cited

UNITED STATES PATENTS

| | | | |
|---|---|---|---|
| 3,617,704 | 11/1971 | Kapsambelis et al. | 235/61.11 E |
| 3,701,097 | 10/1972 | Wolff | 235/61.11 E |

*Primary Examiner*—Thomas J. Sloyan
*Attorney, Agent, or Firm*—Kane, Dalsimer, Kane & Sullivan and Kurucz

[57] ABSTRACT

Automatic coded object identification system for reading labels of the type having retroreflective stripes arranged in a vertical array over a wide depth of field to two or more ranges (specifically three in the embodiment described herein). For each vertical scan of the stripes of a lebel by a scanner a set of electrical signals are produced. Each vertical scan also causes one of three processing control signals to be produced in succession. The electrical signals are amplified, shaped, and analyzed to determine if they meet prescribed limits as to pulse-width measurements for proper label-derived signals. The process control signals control the values of amplification, shaping, and pulse-width measurement limits so that during three successive scans three sets of signals from a label are processed in three different manners. Each of the three process control signals causes the apparatus to optimally process the signals for a label located within a corresponding one of the three ranges. Thus, if a label is within one of the three ranges, the signals produced during one of three scanning operations will be properly processed. When signals are properly processed and found to meet the prescribed limits of pulse-width and other timing criteria, they are stored in a shift register until all the signal data on the label is accumulated. The accumulated data is checked in accordance with pattern recognition and parity checking schemes and if determined to be proper label-derived data it is transmitted to read out apparatus.

5 Claims, 6 Drawing Figures

SIGNAL PROCESSING SYSTEM FOR READING INDICIA OVER A WIDE DEPTH OF FIELD

BACKGROUND OF THE INVENTION

This invention relates to coded object identification systems. More particularly, it is concerned with automatic coded vehicle identification systems for reading labels on vehicles over a wide depth of field.

One well known coded object identification system for deriving information from coded retroreflective labels affixed to objects, for example, railway vehicles, is described in detail in U.S. Pat. No. 3,225,177 issued to Francis H. Stites and Raymond Alexander entitled "Mark Sensing". The system described in the patent is operative to read coded labels affixed to vehicles passing a scanning station and to decode the data content of these labels in order to ascertain the identity of the vehicles passing the scanning station. The labels are fabricated of stripes of colored retroreflective and black non-retroreflective material. Data is encoded in the labels in a two-position base-four code format by various two-stripe combinations of orange, blue, and white retroreflective and black non-retroreflective stripes to represent START and STOP control words and any combination of selected decimal digits 1 through 0. These individual stripes are of substantially equal widths and are mounted in a vertical succession of horizontally oriented stripes on the side of the vehicle, each two-stripe combination being separated from adjacent ones by a black spacer stripe. A significant feature of the code employed is the use of black non-retroreflective stripes as one of the four stripes of the code. The black stripes are used only as a second stripe in the two-stripe combinations because the system employs electrical pulses which are initiated by light reflected from the first stripe of every two-stripe combination, and the black stripes are essentially non-reflective.

To read a label passing a scanning station, a source of light at the scanning station is vertically scanned from bottom to top across the label, and light reflected from the label is received by the scanner and divided by a dichroic optical system into two light beams which are received by respective photosensors. One photosensor is responsive to orange light, while the other is responsive to blue light. Thus, the respective orange and blue photosensors are activated by light reflected from the orange and blue label stripes, and since light reflected from white stripes includes both orange and blue components, both photosensors are activated by light reflected from the white stripes. Neither photosensor is activated when a black non-reflective stripe is scanned.

Output signals from the orange and blue photosensors are converted to standardized pulses by respective standardizer circuits. Pulses from the standardizer circuits may then be appropriately modified and analyzed as in accordance with the system described and claimed in application Ser. No. 865,661, filed Oct. 13, 1969, by Christos B. Kapsambelis, Thomas P. Morehouse, Robert H. Reif, and Francis H. Stites entitled "Signal Processing System." In the system described in the application the leading and trailing edges of pulses from the standardizer circuits are employed to determine if the pulses meet certain pre-established criteria as to pulse-width and pulse-spacing. If these criteria, which are satisfied by authentic data pulses, are met, loading signals are generated causing the pulses to be loaded into appropriate ones of a plurality of buffer flip-flops. When data pulses corresponding to a two-stripe combination have been stored in the buffer flip-flops, they are shifted into a plurality of shift registers. The data pulses are successively shifted along the shift registers until data derived from all the two-stripe combinations of a label have been stored in the shift registers. A further check is then made as to the authenticity of the accumulated data in the shift registers by employing pattern recognition and parity checking systems. If the stored label data passes the parity check, the accumulated data is transferred to readout apparatus for utilization.

As mentioned hereinabove, the individual stripes of a label are of equal widths. Thus, pulses generated when both stripes of a two-stripe combination reflect a color are twice the width of pulses generated when only one of the stripes reflects that color. Since the system must be able to detect whether a pulse is derived from scanning a single stripe or from scanning both stripes of a two-stripe combination, the maximum width of a pulse derived from scanning a single stripe located near the scanning unit must not be greater than twice the minimum width of a pulse derived from scanning a single stripe located farther from the scanning unit. Therefore, the maximum distance between the scanning unit and the label cannot be greater than twice the minimum distance.

Such a limitation in the depth of field of the system has not been found to be critical in the reading of coded labels affixed to railway vehicles by virtue of their being confined to tracks. However, this limitation does place restrictions on the reading of labels in certain non-rail applications, for example, in reading labels on cars, trucks, or buses travelling on a roadway or through tollbooth areas, or in reading labels on trucks or buses entering or leaving transportation terminals or depots.

A coded object identification system for providing an expanded depth of field is disclosed in U.S. Pat. No. 3,587,050 issued to Anthony C. Durante entitled "Coded Object Identification System and Signal Processing Means." Although systems in accordance with the patent operate satisfactorily, entire logic sections of the apparatus must be duplicated in order to analyze pulses derived from scanning labels located within two or more ranges of distances from the scanning unit.

SUMMARY OF THE INVENTION

The system in accordance with the present invention provides for reading labels within an expanded depth of field and checking their authenticity in accordance with the teachings of the aforementioned application of Kapsambelis et al with a minimum of duplications of elements of the apparatus. The system includes information sensing means for sensing the information encoded in a label and for producing a set of electrical signals representative thereof. Signal processing means which are coupled to the information sensing means process signals from the information sensing means in either a first or second predetermined manner depending upon whether a first or a second control signal is supplied thereto. A control signal is applied to the signal processing means by a processing control means which produces the first control signal for a first set of electrical signals whereby the first set of electrical signals is processed in the first predetermined manner and produces the second control signal for a second set of electrical signals whereby the second set of electrical signals is processed in the second predetermined manner.

The signal processing means, when operating to process signals in the first predetermined manner, optimally process signals produced by the information sensing means as a result of sensing information encoded in a label which is located within a first range of distances from the information sensing means. When operating to process signals in the second predetermined manner, the signal processing means optimally processes signals produced by the information sensing means as a result of sensing information encoded in a label which is located within a second range of distances from the information sensing means. Thus, when a label located within the depth of field of the apparatus as determined by the two ranges is subjected to two successive operations of the information sensing means, the data is processed twice. At least one of the processing operations will process the label data optimally with respect to the label distance. The number of ranges and consequently the number of different manners of processing data may be increased beyond two to provide a further expansion of the depth of field as desired for any particular application.

BRIEF DESCRIPTION OF THE DRAWINGS

Additional objects, features, and advantages of systems for processing information encoded in a label in accordance with the present invention will be apparent from the following detailed description together with the accompanying drawings wherein.

DETAILED DESCRIPTION OF THE INVENTION

General Description

Figure 1:
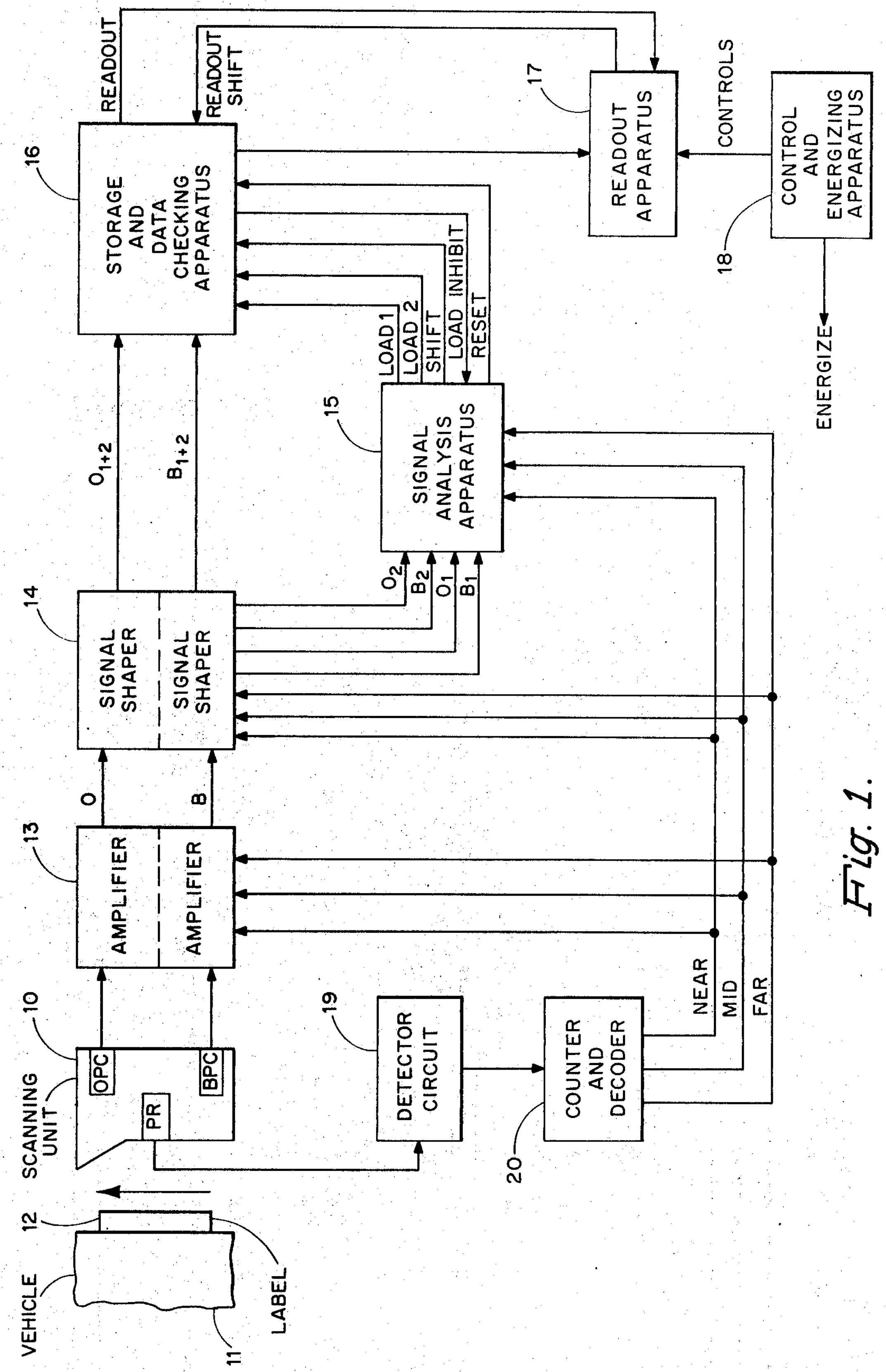
FIG. 1 is a diagrammatic representation in block diagram form of an automatic coded vehicle identification system having a wide depth of field in accordance with the present invention.
Figure 2:
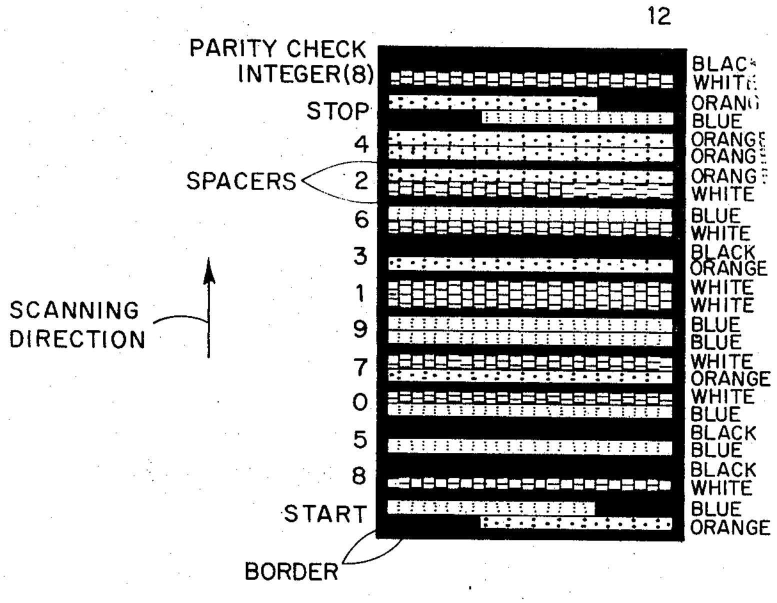
FIG. 2 is a representation of an exemplary label of the type previously described and which is employed in the system of FIG. 1.

A block diagram of a coded vehicle identification system in accordance with the invention is illustrated in FIG. 1. As shown in FIG. 1 the vehicle identification system includes an optical scanning unit 10 for vertically scanning a light beam across a coded retroreflective label 12 affixed to the side of a vehicle 11. An exemplary form of a label 12 is shown in FIG. 2. The label 12 includes a plurality of orange, blue, and white retroreflective stripes and black non-retroreflective stripes arranged in selected two-stripe combinations to represent the identity or other information pertaining to the vehicle.

As a vehicle bearing a coded retroreflective label, such as the label shown in FIG. 2, is presented to the scanning unit 10, the label is repeatedly scanned vertically from bottom to top by light from the scanning unit. Light reflected from the label is returned to and received by the scanning unit and selectively converted into coded electrical signals representative of the information encoded in the label. The return light is separated into "orange" and "blue" components by optics within the scanning unit 10 and applied to orange-responsive and blue-responsive photocells OPC and BPC, respectively.

In response to an orange stripe being scanned, the orange-responsive photocell OPC operates to produce an output signal, and in response to a blue stripe being scanned, the blue-responsive photocell BPC operates to produce an output signal. In response to a white stripe being scanned, both of the photocells OPC and BPC operate simultaneously to produce respective output signals. (White retroreflective light includes both an orange and a blue component). In response to a black non-retroreflective stripe being scanned, neither of the photocells OPC nor BPC operates to produce an output signal.

The portion of the vehicle identification system as described briefly hereinabove is described in greater detail in the aforementioned patent to Stites and Alexander.

The output signals from the orange-responsive and blue-responsive photocells OPC and BPC are applied to respective amplifiers 13. The amplified signals O and B are then applied to respective signal shapers 14. Standardizer circuitry in the signal shapers removes distortion from the electrical signals O and B to provide standardized pulses, either of a first width corresponding to both stripes of a two-stripe combination or of a second width corresponding to a single stripe, and representative of the information encoded in the label. The signal shapers 14 also include circuitry for delaying the leading and trailing edges of the standardized pulses.

These standardized pulses, designated $O_1$ and $B_1$, and the pulses modified by delaying, designated $O_2$ and $B_2$, are applied to signal analysis apparatus 15. The signal analysis apparatus 15 analyzes the applied pulses to determine if their widths and timing sequence satisfy certain pre-established pulse-width and timing criteria for proper label-derived pulses. If the pulses are found to meet the pre-established criteria, data pulses $O_{1+2}$ and $B_{1+2}$, which are combinations of the standardized pulses and the delayed standardized pulses, are loaded into storage and data checking apparatus 16.

After all the data on a label has bee accumulated in the storage and data checking apparatus 16, the stored data is checked by pattern recognition and parity checking systems to determine whether the accumulated data meets certain prescribed criteria for proper label-derived data. If the data is determined to be from proper label-derived pulses, decoded output signals representative of the data content of the label are caused to be transferred to the readout apparatus 17.

Figure 3:
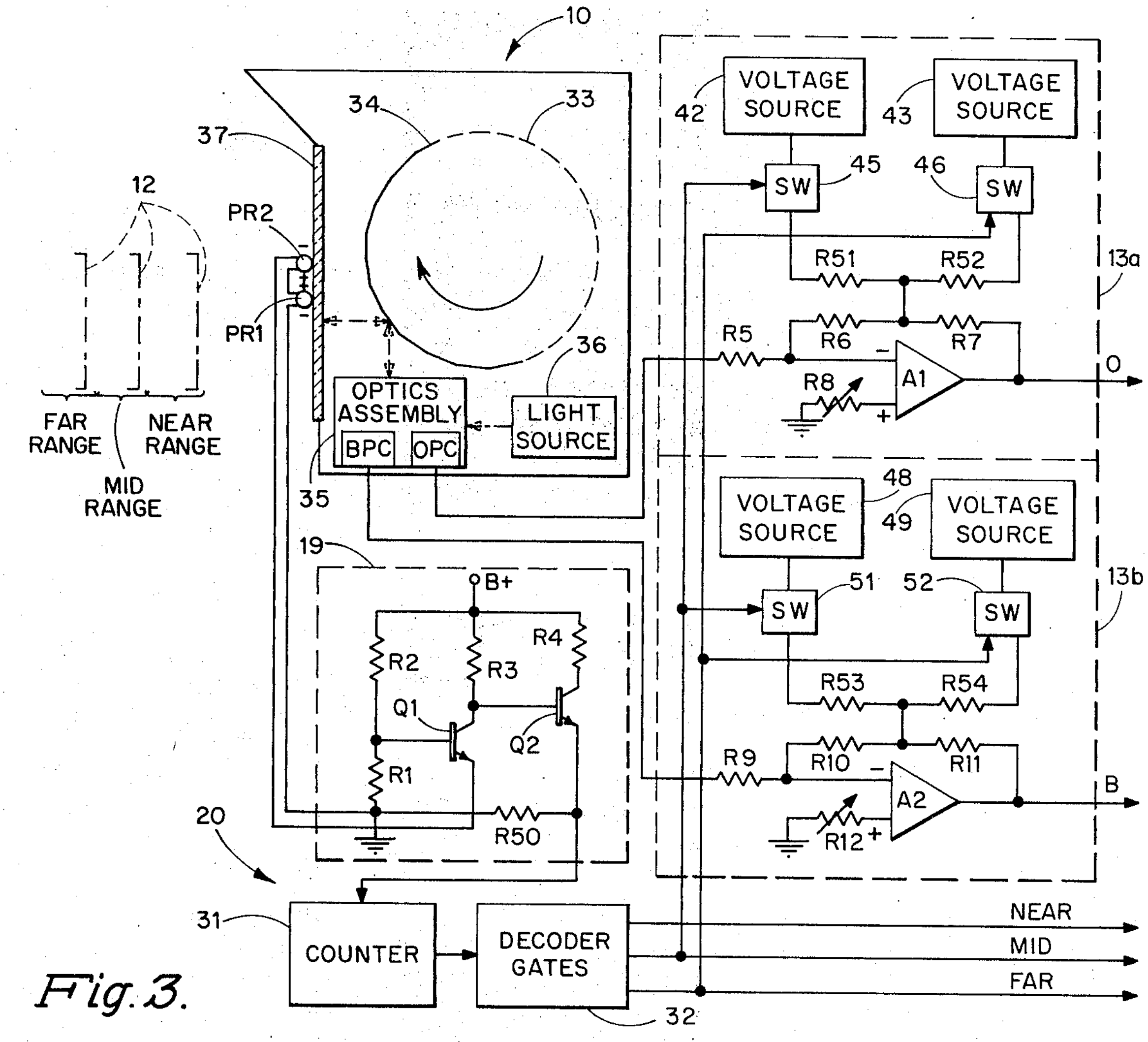
FIG. 3 is a diagrammatic representation of a scanning unit and an electro-optical control arrangement together with a signal amplification arrangement which may be employed in the system of FIG. 1.

In the system as described the orange-responsive and blue-responsive photocells OPC and BPC produce electrical signals which are amplified, modified, and analyzed in three different manners, at least one of which is appropriate depending upon whether the label 12 is within a near, mid, or far range of distances from the scanning unit 10. As indicated in FIG. 3 there is a slight overlap in the ranges to insure that each label within the depth of field is processed appropriately at least once.

For each scanning operation of the label a photoresponsive unit PR mounted in the scanning unit 10 causes a signal to be produced by a detector circuit 19. The signals from the detector circuit 19 are applied to a counter and decoder 20 where they are counted repeatedly through a count of 3 and the count is decoded to produce in succession NEAR, MID, and FAR control signals on appropriate lines. These control signals are applied to the amplifiers 13, the signal shapers 14, and the signal analysis apparatus 15, and cause these sections of the system to process optimally signals derived from a label within either the near range, the mid range, or the far range. Thus, during three scanning operations of a label located within the depth of field established by the three ranges, the signals from the photocells OPC and BPC will be optimally processed at least once to determine if they meet all the criteria for proper label-derived signals. That is, if a label is within the depth of field, during one of three successive scanning operations the signals produced should be found to meet the pre-established criteria so that the data will be accepted and stored in the storage and data checking apparatus 16. Signals which are processed other than optimally by virtue of the label being located in a range not corresponding to the control signal will fail to meet the pre-established criteria and therefore will not be accepted for storage in the data and storage checking apparatus 16. When all the data on a label has been accumulated in the storage and data checking apparatus, it is checked in accordance with pattern recognition and parity checking schemes. This checking procedure is always carried out in the same prescribed manner independently of the range in which the label is located and the process control signals.

The system also includes control and energizing apparatus 18 which may be activated as by the entrance of a vehicle into the label reading area so as to energize the circuitry of the system and to control operation of the readout apparatus 17.

Label

An exemplary form of a label employed in the system of FIG. 1 is illustrated in FIG. 2. The label includes a plurality of orange, blue, and white retroreflective stripes and black non-retroreflective stripes arranged in selected two-stripe code combinations to represent the identity or other information pertaining to the vehicle. The coded retroreflective label is typically fabricated from a plurality of equal width rectangular, orange, blue, and white retroreflective stripes, and non-retroreflective black stripes. The orange, blue, and white retroreflective stripes have the capability of reflecting incident light directed thereon along the path of incidence whereas the black stripes effectively lack such a capability of retroreflection. The label 12, as shown in FIG. 2, is coded in a two-position base-four code format by various two-stripe combinations of the retroreflective orange, blue, and white stripes, and the non-retroreflective black stripes to represent desired information pertaining to the vehicle upon which the label is affixed. For purposes of illustration only, the label as shown in FIG. 2 is encoded to represent a START control word, a plurality of digits 8507913624, a STOP control word, and a parity check integer (8).

The coded stripe-pairs of the label are separated by black non-reflecting spacers and are surrounded on the edges by a black non-reflecting border. The purpose of the non-reflecting spacers is to isolate the stripe-pairs from each other so as to enable processing of the data encoded in the stripe-pairs. In coded vehicle identification systems as presently employed the vertical stripes are 6 inches long and three-eighths inch in vertical width for each individual stripe, and thus three-fourths inch for each stripe-pair, and the black non-reflecting spacers between the stripe-pairs are one-half inch in vertical width.

The value of the parity check integer corresponding to the shown combination of digits is calculated in accordance with a well known system of parity designated the "powers-of-two modulo-11" system. The proper value of the parity check integer as calculated in accordance with he system is 8. This system of parity is described in detail together with an apparatus for checking the information data read from the label against the parity integer in U.S. Pat. No. 3,524,163 to Henry N. Weiss entitled "Parity-Checking Apparatus for Coded Vehicle Identification Systems."

Scanning Unit, Signal Amplification, and Processing Control Arrangement

When a vehicle having a coded retroreflective label 12, such as the label illustrated in FIG. 2, affixed thereto is presented to the scanning unit 10 within a near, mid, or far range of distances from the scanning unit, as illustrated in FIG. 3, the label is repeatedly scanned vertically from bottom to top by light from the scanning unit. The scanning unit 10 as shown in FIG. 3 includes a rotating wheel 33 having a plurality of reflective mirror surfaces 34 on its periphery, an optics assembly 35 including the aforementioned orange-responsive photocell OPC and blue-responsive photocell BPC, and a light source 36. By way of example, the rotating wheel may be 14 inches in diameter, have 12 reflective surfaces on its periphery, and rotate at 1,200 revolutions per minute. In the operation of the scanning unit 10 as the vehicle bearing the label 12 is presented to the scanning unit within one of the ranges of the depth of field, light from the light source 36 is initially directed by the optics assembly 35 onto the reflective mirror surfaces 34 on the rotating wheel 33. When a rotation motion is imparted to the rotating wheel 33 (as by a motor, not shown), the light received by the reflective mirror surfaces 34 is directed onto the label 12 through a transparent plastic or glass plate 37.

The light directed onto the label is retroreflected by each of the retroreflective stripes of the label, as they are successively scanned, along the path of the incident light. The retroreflected light is returned by each retroreflective stripe, as it is scanned, onto the reflective mirror surfaces 34 of the rotating wheel 33 and then to the optics assembly 35. In the optics assembly 35 the return light is separated into its orange and blue components and applied to the orange-responsive and blue-responsive photocells OPC and BPC, respectively. As mentioned previously, in response to an orange stripe being scanned, the orange-responsive photocell OPC is activated to produce an output signal, and in response to a blue stripe being scanned, the blue-responsive photocell BPC is activated to produce an output signal. In response to a white stripe being scanned, both of the photocells OPC and BPC are activated to produce respective output signals, and in response to a black non-retroreflective stripe being scanned, neither of the photocells OPC nor BPC is activated and no output signal is produced.

The output signals selectively produced by the photocells OPC and BPC are applied directly to respective amplifier circuits 13*a* and 13*b*. Operation of the amplifier circuits, which will be explained in detail hereinbelow, are controlled by processing control signals. As mentioned previously, NEAR, MID, and FAR control signals are produced in succession on appropriate control lines during succeeding scanning operations of the scanning unit 10. The control signals may be produced as by the arrangement of photoresponsive devices PR1 and PR2, detector circuit 19, and counter and decoder 20 as illustrated in FIG. 3. As shown in FIG. 3, the photoresponsive devices PR1 and PR2 are positioned on the glass or plastic plate 37 so as to be illuminated by the light directed toward the label 12 by each of the reflective mirror surfaces 34 in sequence. Preferably, the photoresponsive devices PR1 and PR2 are positioned on the plate 37 so as to be illuminated during the top portion or the bottom portion of each light scan provided by each reflective mirror surface 34. The two photoresponsive devices PR1 and PR2, which may be solar cells, are connected in series opposition with the positive terminals being connected together and the negative terminals being connected to the light detector circuit 19.

The negative terminal of the photoresponsive device PR1 is connected directly to ground and the negative terminal of the photoresponsive device PR2 is connected directly to the emitter of an NPN switching transistor Q1. The base of switching transistor Q1 is connected to the juncture of a pair of voltage divider resistors R1 and R2, the opposite end of the resistor R1 being connected to ground and the opposite end of the resistor R2 being connected to a positive voltage source B+. The collector of the switching transistor Q1 is coupled to the positive voltage source B+ through a resistor R3 and also directly to the base of an NPN transistor Q2 arranged in an emitter-follower configuration. The collector of the transistor Q2 is coupled to the positive voltage source B+ via a current limiting resistor R4, and its emitter is directly connected to a counter 31, and resistor R50 to ground.

In the quiescent operating condition, the photoresponsive devices PR1 and PR2 are both exposed to ambient light conditions and any voltages developed across the photoresponsive devices PR1 and PR2 cancel each other because of their series opposing arrangement. Under these conditions, the voltage divider resistors R1 and R2 and the positive voltage source B+ maintain the base-emitter potential of the switching transistor Q1 at a positive value such that the transistor is forward biased in its conducting condition. With the switching transistor Q1 operating in its conducting condition, the base-emitter potential of the transistor Q2 is low and, accordingly, transistor Q2 is reverse-biased in its non-conducting condition. As a result, the emitter of the transistor Q2 is at approximately ground potential and the counter 31 is not actuated.

In the non-quiescent operating condition, as light from one of the reflective mirror surfaces 34 of the rotating wheel 33 illuminates instantaneously the first photoresponsive device PR1, as a label is scanned, a positive voltage is produced across the photoresponsive device PR1 (that is, the photoresponsive device PR1 acts like a positive battery source), and the potential at the emitter of the switching transistor Q1 becomes sufficiently positive with respect to the base so as to reverse bias transistor Q1 to its non-conducting condition. The base-emitter potential of the emitter-follower transistor Q2 accordingly becomes sufficiently positive to be forward biased into its conducting condition. As a result, the leading edge of a square-wave pulse is produced at the emitter of transistor Q2.

As the light from the reflective mirror surface 34 continues to move past the photoresponsive devices PR1 and PR2 such that both of the photoresponsive devices PR1 and PR2 are now simultaneously exposed, opposing voltages are produced across the photoresponsive devices PR1 and PR2 (that is, both of the photoresponsive devices PR1 and PR2 act as opposing positive and negative battery sources, respectively) and the opposing voltages cancel each other. As a result the transistors Q1 and Q2 are returned to their quiescent operating conditions and the trailing edge of a square-wave pulse is produced at the emitter of the emitter-follower transistor Q2.

As the light from the reflective mirror surface 34 moves past the first photoresponsive device PR1 such that only the second photoresponsive device PR2 is now illuminated, a negative voltage is developed across the photoresponsive device PR2. However, this negative serves only to render the voltage at the emitter of transistor Q1 more negative with respect to the base and to hold the transistor Q1 in its conducting condition.

Thus, with each scan of a label by each of the reflective mirror surfaces 34 of the rotating wheel 33, a pulse is produced and applied to the counter 31. The counter 31, which may be a ring counter, is arranged to count through a recurring sequence of three states. The state of the counter 31 is detected by decoder gates 32 so as to produce in sequence NEAR, MID, and FAR control signals on the appropriate control lines. That is, for three successive scans NEAR, MID, and FAR control signals are produced in sequence. As will be explained hereinbelow these signals are employed to control operation of the apparatus so as to optimally process signals generated when a label is located within the corresponding range of the depth of field.

The electrical signals produced by the orange and blue responsive photocells OPC and BPC are amplified by amplifier circuits 13*a* and 13*b*, respectively. In order to process properly the output signals O and B from the amplifiers it is desirable that they be above a minimum detectable or threshold level and not exceed a maximum level whether the label is located within the near, mid, or far range. The least amplification is required for signals derived from labels located in the near range. Therefore, the amplification of the amplifier is controlled so as to be optimal for signals derived from a label within the range corresponding to the control signal.

Each amplifier circuit 13*a* and 13*b* is of the type shown and described in application Ser. No. 88,595 filed Nov. 12, 1970, by Frank G. Macey entitled "Amplifier Circuit Having a Controllable Gain." As described in this application the gain of an operational amplifier A1 or A2 is controlled by an appropriate value of control voltage at the juncture of feedback resistors R6 and R7 or R10 and R11. As illustrated in FIG. 3 two different voltage sources 42 and 43, or 48 and 49 are connected in series with normally-open switches 45 and 46, or 51 and 52 and resistors R51 and R52, or R53 and R54, respectively, to the junction. A MID or FAR control signal actuates one of the switches of each amplifier circuit applying a control voltage at the juncture of the feedback junction. The value of the applied control voltage is such that the amplifier circuits will amplify signals optimally to between he desired levels for a label located within the range corresponding to the applied control signal. The circuit component values are such that during a NEAR control signal when none of the switches are closed, the circuit amplifies optimally for signals derived from a label located in the near range. Since for three successive scans by the scanning unit three different control voltages are applied to each amplifier circuit in sequence, during one of the scans signals O and B which optimally amplified to within the desired levels for further processing will be produced. The switches may be any of various devices, such as, for example, a series-connected transistor which is normally non-conducting and is biased to conduction by the applied control signal.

Pulse Forming and Analyzing

Figure 4:
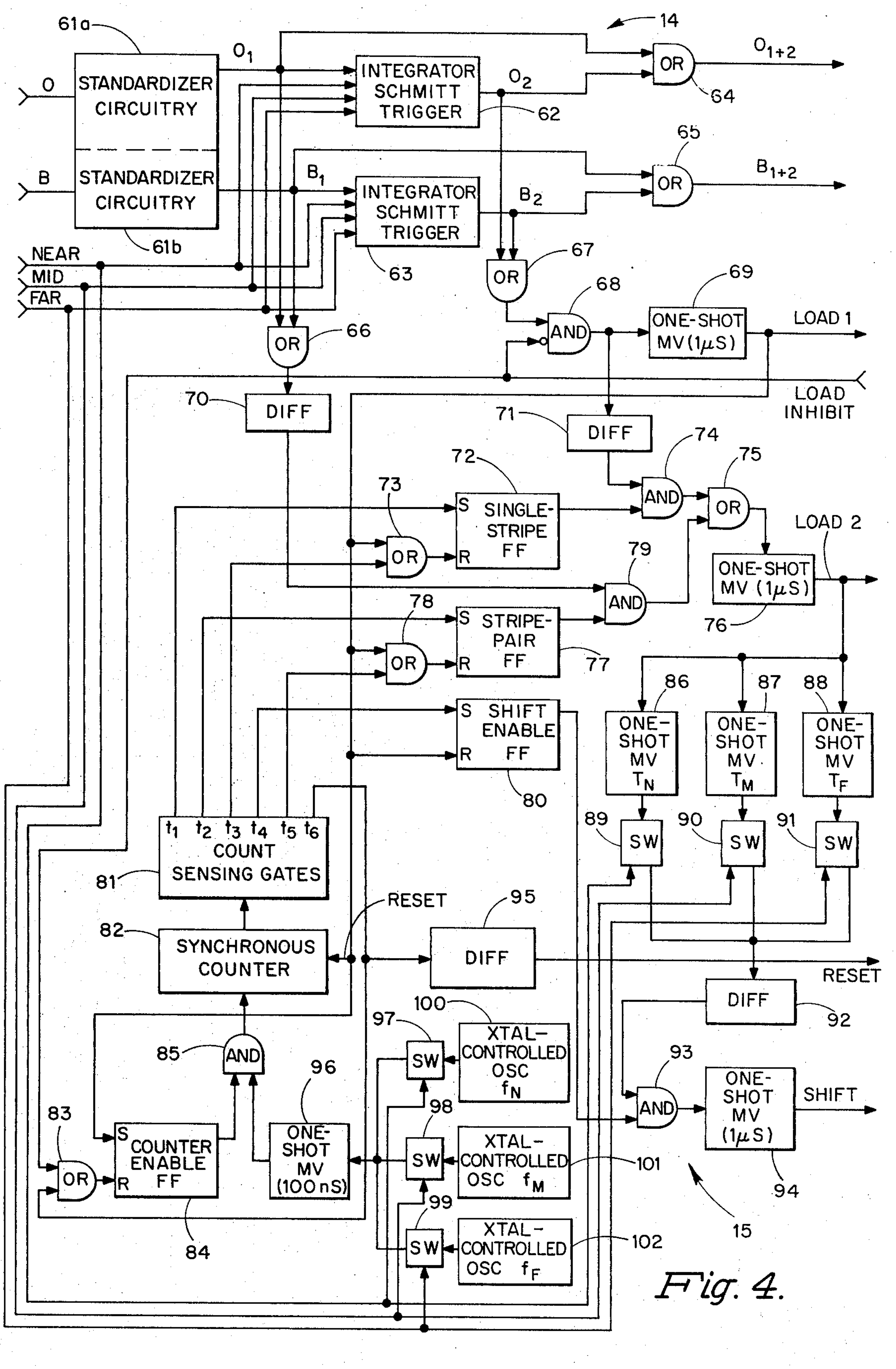
FIG. 4 is a detailed block diagram of apparatus employed in the system of FIG. 1 for shaping signals generated in the scanning unit and for analyzing the signals to determine whether or not the proper timing relationships are present.

Apparatus for shaping the O and B signals received from the amplifiers and for analyzing the resulting signals to determine whether or not they meet certain pre-established criteria is shown in detail in FIG. 4. The O and B signals are applied to standardizer circuitry 61*a* and 61*b*, respectively, of the signal shapers 14. The standardizer circuitry removes distortion and provides standardized pulses $O_1$ and $B_1$ of either a first width corresponding to both stripes of a stripe-pair or of a second width corresponding to a single stripe of a stripe-pair by detecting the widths of the signals between points of a predetermined amplitude. The standardizer circuitry may be of the type described in U.S. Pat. No. 3,229,271 issued to Francis H. Stites entitled "Electro-Optical Label Reading System Using Pulse Width Detection Circuit."

The standardized pulses $O_1$ and $B_1$ are applied to integrator Schmitt trigger circuits 62 and 63, respectively, which operate to delay the leading edge of the standardized pulses by a predetermined first time duration and the trailing edge by a predetermined second time duration. The resulting pulses are designated $O_2$ and $B_2$, respectively. The purpose of providing delayed pulses is explained in the aforementioned application of Kapsambelis et al.

The integrator Schmitt trigger circuits 62 and 63 may be of the type described in U.S. Pat. No. 3,571,626 issued to Robert H. Reif entitled "Integrator Schmitt Trigger Circuit." This circuit may be modified as will be explained in detail hereinbelow, to provide variations in the predetermined time delays of both the leading and trailing edges of the applied pulses. In order to provide proper delays for pulses produced by scanning a label within the near, mid, or far range, the NEAR, MID, and FAR control signals are employed to set appropriate values thereby providing optimum delayed output pulses $O_2$ and $B_2$ during the control signal corresponding to the range in which the label is located.

The delayed pulses $O_2$ and $B_2$, either or both of them, are applied to an OR gate 67 of the signal analysis apparatus 15. The output of the OR gate 67 is applied to one input of an AND gate 68. The AND gate 68 also has an inverting input which is connected to a read flip-flop 112 (in the storage and data checking apparatus 16 illustrated in FIG. 5). The normal condition of the read flip-flop 112 does not provide a LOAD INHIBIT signal. Thus the AND gate 68 is not inhibited, and the occurrence of either an $O_2$ or $B_2$ signal or both, indicating the first stripe of a stripe-pair, triggers a one-shot multivibrator 69. The one-shot multivibrator 69 produces a short pulse (1 microsecond) providing a LOAD 1 signal to two buffer flip-flops FF1 and FF2 in the storage and data checking apparatus 16, shown in FIG. 5, causing to load therein for temporary storage, data pulses from the signal shapers 14.

The data pulses presented to the buffer flip-flops FF1 and FF2 by the signal shapers 14 are combinations of the standardized pulses $O_1$ and $B_1$ and the delayed pulses $O_2$ and $B_2$, respectively. Pulses $O_1$ and $O_2$ are applied to an OR gate 64 and pulses $B_1$ and $B_2$ are applied to an OR gate 65 thereby producing stretched-out data pulses designated $O_{1+2}$ and $B_{1+2}$, respectively. Thus, the data encoded in the first stripe of a stripe-pair is temporarily stored in buffer flip-flops FF1 and FF2.

During the time that pulses $O_{1+2}$ and/or $B_{1+2}$ are being produced in response to the first stripe of a stripe-pair being scanned and are loaded into the buffer flip-flops FF1 and FF2, pulse-width measurements are made to determine if pre-established pulse-width criteria for pulses derived from the single reflected stripe of a stripe-pair having a black second stripe are satisfied. If the pulses are acceptable as being derived from a single stripe, a LOAD 2 signal is produced after termination of the stretched-out pulses $O_{1+2}$ and/or $B_{1+2}$ causing "zeros" (indicating a black second stripe) to be loaded into a second pair of buffer flip-flops FF3 and FF4, shown in FIG. 5.

If the pulses are determined not to be derived from the single stripe of a stripe-pair having a black second stripe, pulse-width measurements are made to determine if pre-established pulse-width criteria for pulses derived from both stripes of a stripe-pair are satisfied. If the pulses are acceptable as being derived from both stripes, a LOAD 2 signal is produced while pulses $O_{1+2}$ and/or $B_{1+2}$ derived by scanning the second stripe of the stripe-pair are present, thereby causing the data encoded in the second stripe to be temporarily stored in the buffer flip-flops FF3 and FF4.

The pulse-width measurements are performed by analyzing the standardized pulses $O_1$ and/or $B_1$ which are combined by an OR gate 66 and the standardized delayed pulses $O_2$ and/or $B_2$ which are combined by the OR gate 67. The output pulse from the one-shot multivibrator 69, initiated by a pulse $O_2$ and/or $B_2$ corresponding to the first stripe of a stripe-pair as mentioned previously, is applied through OR gate 72 to reset a single stripe flip-flop 72, through OR gate 78 to reset a stripe-pair flip-flop 77, to reset a shift enable flip-flop 80, to reset a synchronous counter 82 to its cleared condition, and to set a counter enable flip-flop 84.

Three crystal controlled oscillators 100, 101, and 102 operate at three different frequencies $f_N$, $f_M$, and $f_F$, one of the frequencies being appropriate depending upon whether the pulses being analyzed are derived from a label within the near, mid, or far range. The crystal controlled oscillators 100, 101, and 102 are connected through normally-open switches 97, 98, and 99, respectively, to a 100 nanosecond one-shot multivibrator 96. Depending upon which control signal, NEAR, MID, or FAR, is produced by the decoder gates 32 (FIG. 3), one of the switches 97, 98, or 99 is closed. The output of the associated crystal controlled oscillator 100, 101, or 102 triggers the one-shot multiivbrator 96 at a constant rate to produce a train of pulses 100 nanoseconds wide with spacing determined by the oscillator frequency $f_N$, $f_M$, or $f_F$.

The pulses produced by the one-shot multivibrator 96 are gated through an AND gate 85 when the counter enable flip-flop 84 is in its set condition. The signals from the one-shot multivibrator 96 gated through the AND gate 85 are counted by the synchronous counter 82.

Predetermined ones of the accumulated counts in the synchronous counter 82 after the counter starts counting from its cleared condition are sensed by an arrangement of count sensing gates 81. In response to sensing these counts, appropriate timing signals, each of which is a pulse of short duration, are produced in succession at the outputs of the count sensing gates 81 for controlling the operations of various parts of the signal analysis apparatus 15. The timing of the pulses is designated as $t_1$–$t_6$. The actual time duration between these pulses will vary depending upon the particular crystal controlled oscillator 100, 101, or 102 connected to the one-shot multivibrator 96, but the ratios of the time durations will be the same.

Timing signal $t_1$ which occurs a predetermined number of counts after starting of the synchronous counter 82 is applied to the single stripe flip-flop 72 setting that flip-flop and producing an output to the AND gate 74. A second input to the AND gate 74 is obtained for a differentiator 71 which produces a pulse when the signal from the AND gate 68 terminates on the trailing edge of the standardized delayed pulse $O_2$ and/or $B_2$. A timing signal $t_3$ from the count sensing gate 81 is applied to the OR gate 73 resetting the single stripe flip-flop 72. Thus, an output signal from the AND gate 74 occurrs on the trailing edge of a delayed pulse $O_2$ and/or $B_2$ only if that trailing edge occurs at a time after timing pulse $t_1$ and before timing pulse $t_3$. The timing pulses $t_1$ and $t_3$ provide a pulse-width test for a single stripe (that is, a stripe-pair with a black second stripe) such that pulses $O_2$ and/or $B_2$ which terminate before time $t_1$ and after $t_3$ do not meet the established criteria for a single stripe pulse and therefore fail to actuate the AND gate 74.

Figure 5:
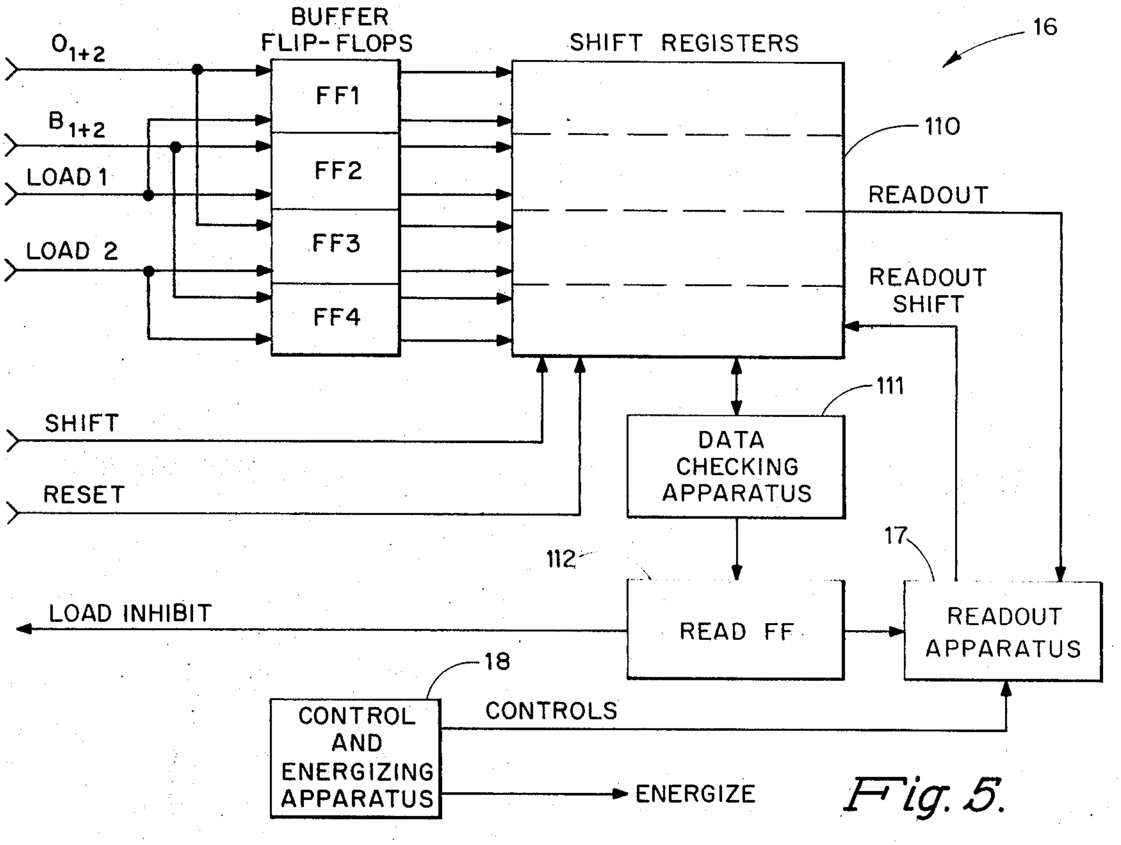
FIG. 5 is a representation in block diagram form of apparatus for further processing signals received from the apparatus of FIG. 4.

When a signal derived from a signal stripe passes this pulse-width test, the output signal from the AND gate 74 passes through an OR gate 75 and triggers a one-shot multivibrator 76. The one-shot multivibrator 76 produces a short pulse (1 microsecond) which is a LOAD 2 signal to the second pair of buffer flip-flops FF3 and FF4 (FIG. 5). Since, in this instance, the stripe-pair being scanned includes only a single stripe (that is, the second stripe is black) and the $O_2$ and/or $B_2$ pulses derived from the single stripe have terminated, the LOAD 2 signal causes the flip-flops FF3 and FF4 to load "zeros".

The second timing signal $t_2$ from the count sensing gates 81 sets the stripe-pair flip-flop 77 which produces an output signal to AND gate 79. The other input to the AND gate 79 is from the standardizer circuitry 61$a$ and 61$b$ through an OR gate 66 and a differentiator 70. The differentiator 70 produces a pulse on the trailing edge of the $O_1$ and/or $B_1$ pulses from the standardizer circuitry. Timing signal $t_5$ from the count sensing gates 81 is applied through OR gate 78 to reset the stripe-pair flip-flop 77. Thus, AND gate 79 produces an output signal on the trailing edge of the $O_1$ and/or $B_1$ pulse only if the stripe-pair 77 is in a set condition. That is, if the $O_1$ and/or $B_1$ pulse terminates after the occurrence of timing signal $t_2$ but before the occurrence of timing signal $t_5$, AND gate 79 produces an output signal. The output signal from the AND gate 79 passes through OR gate 75 triggering the one-shot multivibrator 76 and producing a LOAD 2 signal to the second pair of buffer flip-flops FF3 and FF4 (FIG. 5). Since the portion of the stretched-out version of the pulses $O_{1+2}$ and/or $B_{1+2}$ which are derived from the second stripe of the stripe-pair have not yet terminated, the pulse data is loaded into buffer flip-flops FF3 and FF4. Thus, pulses which are derived from scanning both stripes of a stripe-pair are tested to determine that the pulses meet the pre-established pulse-width criteria, and the data encoded in the second stripe is entered in the buffer flip-flops for temporary storage.

After the pulses corresponding to a given stripe-pair of a label have been stored in the buffer flip-flops FF1-FF4, that is, after the termination of a LOAD 2 signal (produced as a result of the operation of either AND gate 74 or AND gate 79), the pulses are retained in the buffer flip-flops FF1-FF4 for a predetermined time duration for the purpose of performing an additional check on the pulses to further determine whether the pulses are proper label-derived pulses. It has been determined that if noise is present in the system it generally precedes the data within a certain period of time. Therefore, if new pulses are received within this predetermined period after pulses have been stored in the buffer flip-flops, the pulses present in the flip-flops are considered to be noise and are prevented from being further processed. Instead, the new pulses are processed in the same manner as previously described and loaded into the buffer flip-flops to replace the previous pulses. If no new pulses are received during the predetermined period, the pulses stored in the buffer flip-flops are further processed.

This check on whether the stored pulses are proper label data pulses or noise is performed in the following manner. The LOAD 2 signal from the one-shot multivibrator 76 triggers three one-shot multivibrators 86, 87, and 88 which produce relatively long output pulses (of the order of 10 to 20 microseconds, for example). The duration of the output pulses from the multivibrators 86, 87, and 88, designated $T_N$, $T_M$, and $T_F$, are set to be appropriate to provide the optimal time period depending on whether the label is within the near, mid, or far range, respectively. Therefore, the output pulse of only one of the three one-shot multivibrators 86, 87, and 88 is applied to a differentiator 92. The particular multivibrator is selected by which of the normally-open switches 89, 90, or 91 is closed by a NEAR, MID, or FAR control signal, respectively. The differentiator 92 produces an output pulse on the trailing edge of the relatively long time duration pulse from the selected one-shot multivibrator 86, 87, or 88. The output of the differentiator 92 is applied to an AND gate 93.

The other input to the AND gate 93 is the output from the shift enable flip-flop 80. The shift enable flip-flop 80 is previously triggered to the set condition at an appropriate time by a $t_4$ timing signal rom the count sensing gates 81. The shift enable flip-flop 80 is reset by the one-shot multivibrator 69 as it produces a LOAD 1 signal on the receipt of new signals indicating a stripe-pair. Thus, the AND gate 93 produces an output signal on the trailing edge of the pulse from the selected multivibrator 86, 87, or 88 only if the trailing edge occurs before the occurrence of signals indicating a stripe-pair is being scanned. The delay in producing the signal provides sufficient time to further insure that the data stored in the buffer flip-flops FF1-FF4 is label-derived data and not noise preceding proper label data.

An output signal from the AND gate 93 triggers a one-shot multivibrator 94 which produces a short duration (1 microsecond) SHIFT signal. The SHIFT signal causes the pulses stored in the buffer flip-flops FF1–FF4 to be shifted into the shift registers 110 (FIG. 5) and any data previously loaded in the shift registers to be shifted one stage.

An additional time check is also performed by the apparatus employing the timing signal $t_6$ from the count sensing gates 81. Timing signal $t_6$ occurs later than the expected occurrence of the leading edge of the pulse $O_2$ and/or $B_2$ derived from the first stripe of the next following stripe-pair of the label being scanned. The $t_6$ timing signal is applied to the shift registers 110 (FIG. 5) by way of a differentiator 95 and to the counter enable flip-flop 84 by way of an OR gate 83. Thus, if the synchronous counter 82 is not reset to its cleared condition by the one-shot multivibrator 69 producing a LOAD 1 signal before the $t_6$ timing signal, a $t_6$ signal will occur causing the shift registers 110 to be reset to all "zeros" and the synchronous counter 84 to be reset thereby stopping the synchronous counter 82. That is, the resetting operation initiated by timing signal $t_6$ takes place only if the time between data signals does not meet the pre-established criteria for spacing between stripe-pairs of the label.

Data Checking and Readout

The data encoded in a pair of stripes of the label is thus stored in the appropriate buffer flip-flops FF1–FF4 (FIG. 5) while the stripes are being scanned by the scanning unit as explained hereinabove. The data is removed from the buffer flip-flops FF1–FF4 and shifted through the stages of the four shift registers 110 in the general manner described, for example, in the aforementioned patent to Stites and Alexander, by SHIFT pulses from the one-shot multivibrator 94. After the data of an entire label has been loaded into the shift registers 110, it is checked for completeness and accuracy by suitable data checking apparatus 111. The data checking apparatus may employ any of various known pattern recognition techniques, such as identifying the presence of the START and STOP words in the proper register stages. (See, for example, the aforementioned patent to Stites and Alexander or U.S. Pat. No. 3,417,231 issued to Francis H. Stites and Bradstreet J. Vachon, entitled "Mark Sensing System".) The accumulated data is also checked against the parity check integer in accordance with a particular parity checking scheme such as that described in the aforementioned patent to Weiss.

When the data checking apparatus 111 has determined that the data stored in the shift registers meets the pre-established criteria and relates to valid label data, it produces an output signal to the read flip-flop 112. The read flip-flop 112 changes states to produce a LOAD INHIBIT signal which inhibits the AND gate 68 and also resets the counter enable flip-flop 84 by way of the OR gate 83 so as to prevent continued operation of the synchornous counter 82. The read flip-flop 112 also signals the readout apparatus 17 to cause a READOUT SHIFT signal to be applied to the shift registers 110 whereby the accumulated contents of the shift registers is transferred to the readout apparatus 17. Clearing of the data from the shift registers 110 causes the read flip-flop 112 to be reset removing the LOAD INHIBIT signal and placing the apparatus in readiness for receiving data during the next operation of the scanning unit.

Integrator Schmitt Trigger Circuit

Figure 6:
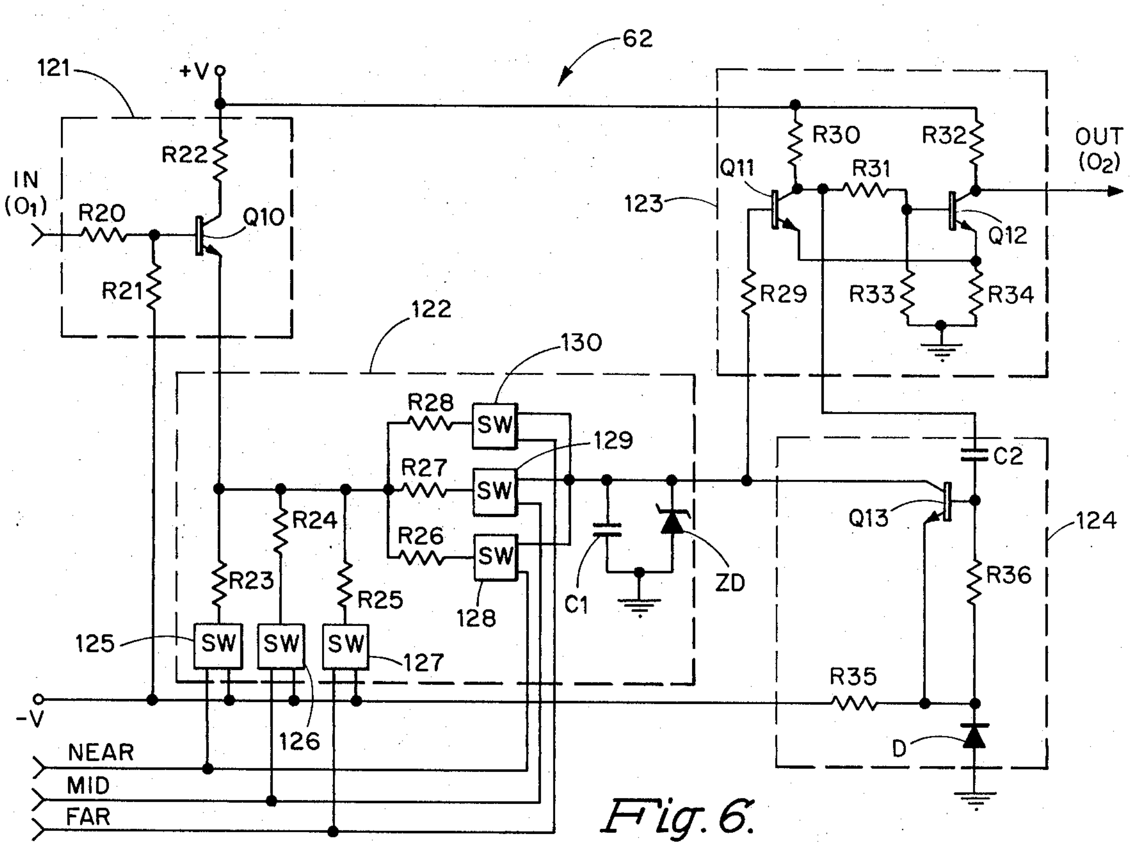
FIG. 6 is a detailed circuit diagram of an integrator Schmitt trigger circuit which may be employed for shaping signals in the apparatus of FIG. 4.

The integrator Schmitt trigger circuits 62 and 63 as described briefly hereinabove are described in detail in the aforementioned patent to Reif. The circuit 62 for providing different delays for the delayed pulse $O_2$ in response to the standardized pulse $O_1$ is shown in detail in the circuit diagram of FIG. 6. The circuit operates in the manner described in the patent to Reif, and as explained therein delays in the leading and trailing edges of the output pulses with respect to those of the input pulses are determined by the values of resistances in the integrator section 122. The leading edge delay is determined by selecting one of resistances R26, R27, and R28 and the trailing edge delay is determined by selecting one of resistances R23, R24, and R25.

Resistances R23, R24, and R25 are connected in series with normally-open switches 125, 126, and 127, respectively, and resistances R26, R27, and R28 are connected in series with normally-open switches 128, 129, and 130, respectively. The NEAR, MID, and FAR control signals are applied to switches 125 and 128, 126 and 129, and 127 and 130, respectively, to close the appropriate switches. Thus, appropriate values of resistances are placed in the circuit for providing optimum values of delay for processing data derived from labels in the near, mid, and far ranges during the corresponding control signal.

Summary of Operation

For exam scan of the light beam across a label, signals are produced, shaped, and analyzed by the apparatus as explained hereinabove. By virtue of the control signals which are produced in sequence, a different one during each scanning operation in three successive operations, the signals derived from the label are processed in three different predetermined manners, at least one of which is optimum for the label depending upon its distance from the scanning unit. Thus, during at least one of three scanning operations the data is processed in an appropriate manner for its location.

The apparatus may be modified to cover a greater depth of field by increasing the number of different ranges of distance and processing procedures to more than three. Conversely, in certain situations two ranges and processing procedures may be sufficient. In any event, the number of elements of the system which must be duplicated are kept at a minimum by only altering those elements which determine the values of the prescribed limits to which the pulses are to be measured.

The following table is an example of specific values applicable to a system for reading labels having a single stripe width of three-eighths inch and a spacing between the stripe-pairs of one-half inch and covering a depth of field from 5 to 15 feet in three ranges. The scanning wheel includes 12 mirror surfaces and rotates at 1,200 revolutions per minute.

| | Near Range | Mid Range | Far Range |
|---|---|---|---|
| Distance from Scanner to Label (Nominal) | 5–8 ft. | 8–11 ft. | 11–15 ft. |
| Time Duration | | | |
| Single Stripe - Min. | 13.9 μs | 10.3 μs | 8 μs |
| Single Stripe - Max. | 25.7 μs | 16.1 μs | 11.7 μs |
| Two-Stripe Combination - Min. | 30.3 μs | 22 μs | 17.3 μs |
| Two-Stripe Combination - Max. | 53.2 μs | 33.3 μs | 24.3 μs |
| Spacer - Min. | 20.2 μs | 14.7 μs | 10.4 μs |
| Spacer - Max. | 83 μs | 52 μs | 38 μs |
| Signal Amplification by Amplifiers | 6 db | 18 db | 30 db |
| Pulse Delay by Integrator Schmitt Trigger Circuits | | | |
| Leading Edge | 5.8 μs | 4 μs | 2.9 μs |
| Trailing Edge | 10 μs | 7 μs | 5.1 μs |
| Crystal Controlled Oscillator | $f_N$=2.9 Mhz | $f_M$= 4 Mhz | $f_F$=5.4 Mhz |
| Multivibrator Pulse Duration | $T_N$= 18 μs | $T_M$= 13 μs | $T_F$=9.6 μs |

While there has been shown and described what is considered a preferred embodiment of the present invention, it will be obvious to those skilled in the art that various changes and modifications may be made therein without departing from the invention as defined in the appended claims.

What is claimed is:

1. A system for processing information encoded in a label affixed to an object, said label comprising a plurality of radiation-reflecting code elements arranged in accordance with a predetermined code format to represent information pertaining to the object, said label being presented by said object to an information sensing means at a distance from the information sensing means; said system comprising information sensing means for repeatedly sensing the information encoded in the plurality of radiation-reflecting elements of a label presented thereto and for producing sets of electrical signals representative of the information encoded in the plurality of radiation-reflecting elements of the label, said information sensing means including scanning means for repeatedly scanning the radiation-reflecting elements of the label with an incident beam of electromagnetic radiation; and means arranged to receive electromagnetic radiation reflected from the radiation-reflecting elements and operable in response to electromagnetic radiation received after reflection from the radiation-reflecting elements to produce a set of electrical signals representative of the information encoded in the plurality of radiation-reflecting elements of the label during each operation of the scanning means to scan the raditaion-reflecting elements of the label;

signal processing means including pulse-width detection circuit means operable to measure the widths at predetermined amplitude points of the signals received from the information sensing means and means operable to process signals produced by the information sensing means in a first predetermined manner in response to a first control signal being applied thereto and to process signals produced by the information sensing means in a second predetermined manner in response to a second control signal being applied thereto; said signal processing means when operating to process signals in the first predetermined manner optimally processes signals produced by the information sensing means when a label is presented thereto within a first range of distances therefrom, and said signal processing means when operating to process signals in the second predetermined manner optimally processes signals produced by the information sensing means when a label is presented thereto within a second range of distances therefrom;

means coupling said information sensing means and said signal processing means;

additional signal processing means including storage means coupled to the signal processing means for storing a set of signals from the signal processing means; and signal checking means coupled to the storage means for examining signals stored in the storage means to determine whether said signals satisfy certain pre-established criteria and operable to cause the signals stored in the storage means to be read out from the storage means if the signals stored therein satisfy said pre-established criteria; and processing control means coupled to the information sensing means and to the signal processing means and operable in response to successive operations of the scanning means to scan the plurality of radiation-reflecting elements of a label presented thereto to produce the first control signal and the second control signal in succession.

2. A system in accordance with claim 1 wherein said signal processing means includes pulse-width checking means coupled to the pulse-width detection circuit means and to said storage means and operable to determine whether the measured signal widths are within prescribed limits and to cause signals received from the information sensing means to be stored in the storage means when the measured signal widths are determined to be within the prescribed limits;

said pulse-width checking means including means coupled to the processing control means and operable to establish a first set of values for said prescribed limits when the first control signal is being produced by the processing control means and to establish a second set of values for said prescribed limits when the second control signal is being produced by the processing control means.

3. A system in accordance with claim 2 wherein said processing control means includes first circuit means coupled to the scanning means and operable to produce an output signal in response to each operation of the scanning means to scan the radiation-reflecting elements of a label; and second circuit means operable in response to each output signal from the first circuit means to change the output of the processing control means from one control signal to another control signal.

4. A system in ccordance with claim 3 including an amplifying means connected between said means of the information sensing means and said signal processing means for amplifying electrical signals produced by said means; and amplifying control means coupled to said amplifying means and to said processing control means and operable to cause said amplifying means to amplify signals applied thereto by a first amount in response to the first control signal being applied thereto and by a second amount in response to the second control signal being applied thereto; electrical signals produced by said means while the scanning means is scanning the radiation-reflecting elements of a label presented thereto within the first range of distances being amplified to within predetermined levels when amplified by said first amount and electrical signals produced by said means while the scanning means is scanning the radiation-reflecting elements of a label presented thereto within the second range of distances being amplified to within substantially the same predetermined levels when amplified by said second amount.

5. A system in accordance with claim 4 wherein the radiation-reflecting elements of a label are selected from retroreflective stripes of a first color, a second color, and a third color, and non-reflecting stripes of a fourth color, said stripes being arranged in a vertical array of paired combinations of stripes with each pair being separated vertically by a non-reflecting spacer; and the electromagnetic radiation is visible light.

* * * * *